(12) United States Patent
Chiou

(10) Patent No.: US 7,901,529 B2
(45) Date of Patent: Mar. 8, 2011

(54) FLEXIBLE BALLISTIC FABRIC AND ARTICLES MADE THEREFROM

(75) Inventor: Minshon J. Chiou, Chesterfield, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 77 days.

(21) Appl. No.: 11/645,973

(22) Filed: Dec. 27, 2006

(65) Prior Publication Data

US 2008/0160247 A1    Jul. 3, 2008

(51) Int. Cl.
  *F16G 1/00* (2006.01)
  *B29C 47/00* (2006.01)
  *C09J 5/10* (2006.01)
(52) U.S. Cl. ............... 156/138; 156/244.13; 156/306.6
(58) Field of Classification Search .............. 428/102, 428/109, 113, 292.1
  See application file for complete search history.

(56) References Cited

U.S. PATENT DOCUMENTS

| | | |
|---|---|---|
| 3,094,511 A | 6/1963 | Hill, Jr. et al. |
| 3,354,127 A | 11/1967 | Hill, Jr. et al. |
| 3,673,143 A | 6/1972 | Bair et al. |
| 3,819,587 A | 6/1974 | Kwoleck |
| 3,869,429 A | 3/1975 | Blades |
| 4,172,938 A | 10/1979 | Mera et al. |
| 4,457,985 A | 7/1984 | Harpell et al. |
| 5,061,545 A | 10/1991 | Li et al. |
| 5,160,776 A | 11/1992 | Li et al. |
| 5,196,252 A * | 3/1993 | Harpell .................. 428/102 |
| 5,677,029 A | 10/1997 | Prevorsek et al. |
| 6,022,601 A | 2/2000 | Pfister et al. |
| 6,238,768 B1 | 5/2001 | Van de Goot |
| 2002/0034624 A1 | 3/2002 | Harpell et al. |
| 2002/0037391 A1 | 3/2002 | Harpell et al. |
| 2006/0286880 A1 | 12/2006 | Termonia |
| 2006/0286882 A1 | 12/2006 | Samant et al. |

FOREIGN PATENT DOCUMENTS

| | | |
|---|---|---|
| WO | WO 93/20400 | 10/1993 |
| WO | WO 02/14588 A1 | 2/2002 |
| WO | WO 2006/083312 A1 | 8/2006 |

OTHER PUBLICATIONS

W. Black et al., Interscience Publishers, 1968, Man-Made Fibers—Science and Technology, vol. 2, Section titled Fiber-Forming Aromatic Polyamides, p. 297.

(Continued)

*Primary Examiner* — D. Lawrence Tarazano
*Assistant Examiner* — Camie S Thompson

(57) ABSTRACT

The invention concerns a penetration resistant article comprising a plurality of substantially planar elements; each element comprising at least one fibrous layer formed of multifilaments having a linear density of at least 200 dtex, a tenacity of at least 10 grams per dtex, and an elongation to break of at least 2%; and superposed upon at least one of the fibrous layers, a polymer layer comprising a thermoplastic polymer, a thermoset polymer, or a polymer having glass transition temperature of −40° C. to 0° C., a molecular weight (Mw) of 20,000 to 100,000, and a viscosity of about $2 \times 10^6$ to about $10^{13}$ poise at 20° C.; the polymer layer covering and being adhered to from 25% to 75% of the area of the fibrous layer, wherein the area not covered by the polymer layer comprises a plurality of discrete areas.

4 Claims, 1 Drawing Sheet

OTHER PUBLICATIONS

B. Brew, P.J. Hine, I.M. Ward, The Properties of PIPD-Fibre/Epoxy Composites, Composites Science and Technology, vol. 59, 1999, p. 1109.

O.C. Van der Jagt and A. Beukers, The Potential of a New Rigid-Rod Polymer Fibre ('M5') in Advanced Composite Structures, Polymer, vol. 40, 1999, p. 1035.

D.J. Sikkema, Design, Synthesis and Properties of a Novel Rigid Rod Polymer, PIPD or 'M5': High Modulus and Tenacity Fibres with Substantial Compressive Strength, Polymer, vol. 39, 1998, p. 5981.

E.A., Klop and M. Lammers, XRD Study of the New Rigid-Rod Polymer Fibre PIPD, Polymer, vol. 39, No. 24, 1998, p. 5987.

J.C.L. Hageman, J.W. Van der Horst, R.A. De Groot, An Ab Initio Study of the Structural and Physical Properties of a Novel Rigid-Rod Polymer: PIPD, Polymer, vol. 40, 1999, p. 1313.

* cited by examiner

FLEXIBLE BALLISTIC FABRIC AND ARTICLES MADE THEREFROM

FIELD OF THE INVENTION

The present invention concerns flexible ballistic fabrics and articles made therefrom.

BACKGROUND OF THE INVENTION

U.S. Pat. No. 5,677,029 teaches a flexible penetration resistant composite having at least one fibrous layer comprised of a network of fibers, and at least one continuous polymeric layer comprised of a thermoplastic resin and/or a thermosetting resin. In this composite, the continuous polymeric layer coextensive with a surface of one of the fibrous layers.

Other publications teaching various combinations of fiber network and matrix include U.S. Patent Application Nos. 2002/0037391 and 2002/0034624 which disclose a composite having a fibrous web with a plurality of matrix islands contained therein. The matrix islands connect at least two filaments to hold the plurality of filaments in a unitary structure. U.S. Pat. No. 5,061,545 discloses a fiber/polymer composite with non-uniformly distributed polymer matrix. U.S. Pat. No. 6,238,768 discloses a plurality of composite layers which each composite layer is made up of at least two or monolayers of unidirectionally oriented fibers in a matrix. U.S. Pat. No. 5,160,776 teaches a composite made from one or more layers where at least one of layer is a network of filaments in a matrix material.

Despite the progress that has been made in making fabrics with improved ballistic performance, there is a need in the art for fabrics with improved performance, especially in the area of backface deformation.

SUMMARY OF THE INVENTION

In one embodiment, the invention concerns a penetration resistant article comprising a plurality of substantially planar elements; each element comprising:

at least one fibrous layer formed of multifilaments having a linear density of at least 200 dtex, a tenacity of at least 10 grams per dtex, and an elongation to break of at least 2%; and superposed upon at least one of the fibrous layers, a thermoplastic polymer, a thermoset polymer, or a polymer layer having glass transition temperature of $-40°$ C. to $0°$ C., a molecular weight (Mw) of 20,000 to 100,000, and a viscosity of about $2\times10^6$ to about $10^{13}$ poise at $20°$ C.; the polymer layer covering and being adhered to from 25% to 75% of the area of the fibrous layer, wherein the area not covered by the polymer layer comprises a plurality of discrete areas.

In some embodiments, the polymer layer covers and adheres to from 30% to 70%, or 35% to 65%, or 40% to 60%, or 45% to 55% of the area of the fibrous layers. In some embodiments, all fibrous layers have a polymer layer superposed thereon. In certain embodiments, all but one fibrous layer has the polymer layer superposed thereon.

In certain embodiments, the polymer layer comprises a thromoplastic or thermoset polymer.

In some embodiments, the discrete areas have an average size of from 0.25 cm$^2$ to 150 cm$^2$. The discrete areas can be any shape that does not detract from the performance of the article. These shapes include, but are not limited to circular, square, triangular, rectangular, polygonal or defined by irregular contours.

In some embodiments, the discrete areas are 1 to 100 cm$^2$, 2 to 80 cm$^2$, or 5 to 60 cm$^2$.

Suitable multifilament yarns include polyamide fibers, polyethylene fibers, polyareneazole fibers, polyolefin fibers, or mixtures thereof. In some embodiments, these fibers have a linear density of 200 to 4500 dtex per fiber.

Examples of suitable fibers include aramids such as poly (p-phenylene terephthalamide) fibers. Suitable polyarenazole fibers include polybenzazole fibers or polypryridazole fibers. Suitable polybenzazole fibers include poly(benzobisoxazole, poly(benzobisthiazole) fibers and poly(benzobisimidazole). In some embodiments, the polypyridazole fibers are poly (pyridobisimidazole fibers, poly(pyridobisthiazole) fibers, or poly(pyridobisoxazle) fibers. In certain embodiments, the multifilament yarn comprises poly[2,6-diimidazo[4,5-b:4,5-e]-pyridinylene-1,4(2,5-dihydroxy)phenylene).

The fibrous layer can be a woven fabric or a nonwoven fabric.

In some embodiments, the thermoplastic material is an elastomer having an initial tensile modulus less than about 6,000 psi (41.3 MPa) as measured by ASTM D638. In certain embodiments, the thermoset material is a rigid resin having an initial tensile modulus at least about 10,000 psi (68.8 Mpa) as measured by ASTM D638.

In some embodiments, the polymer layer can comprise one or more of poly(vinyl propionate), poly(hexyl methacrylate), poly(isopropyl acrylate), and ethylene/methyl acrylate copolymer.

Some articles of the invention are ballistic resistant garments.

The invention also concerns a method of making an article for use in resisting ballistic threats. In some embodiments, the method comprises:

providing a polymer layer comprising a thermoplastic polymer, a thermoset polymer, or a polymer having a glass transition temperature of $-40°$ C. to $0°$ C., a molecular weight of 20,000 to 100,000, and a viscosity of about $2\times10^6$ to about $10^{13}$ poise at $20°$ C.;

forming a plurality of holes in said polymer layer; and covering and adhering said polymer layer to a first side of a fibrous layer, the fibrous layer having a first and a second side and comprising a plurality of multifilament yarns having a linear density of at least 200 dtex, a tenacity of at least 10 grams per dtex, and an elongation to break of at least 2%;

whereby more than 25% and less than 75% of the first side of the fibrous layer is covered and adhered by the polymer layer.

DETAILED DESCRIPTION OF ILLUSTRATIVE EMBODIMENTS

Figure 1:
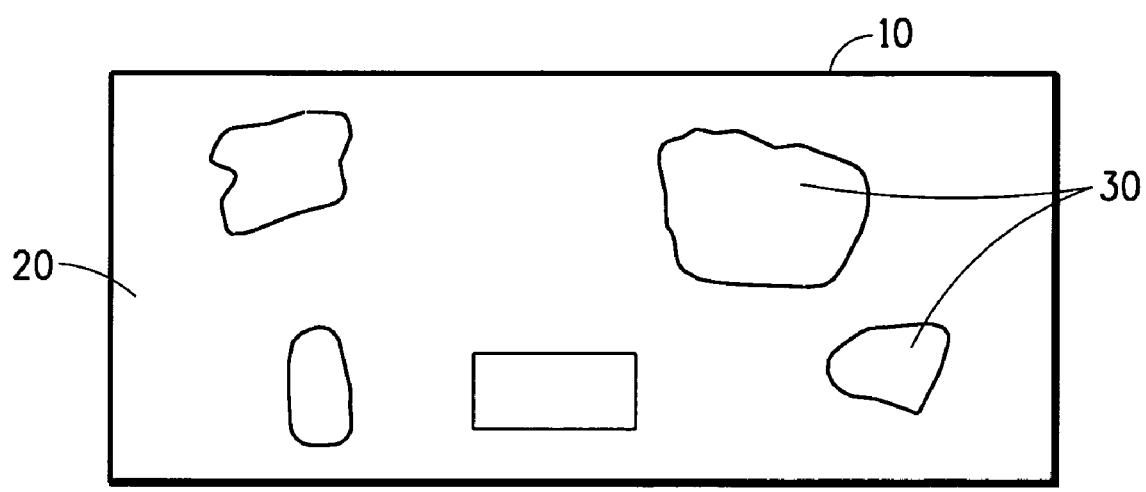
FIG. 1 shows an article comprising a fibrous layer having a polymer coating covering and adhering to one of its sides. The coating layer has a plurality of isolated domains where the coating material is absent.

The present invention may be understood more readily by reference to the following detailed description of illustrative and preferred embodiments that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The articles of the present invention comprise a plurality of composite layers, said composite layers comprising:

a fibrous layer, having a first and a second side, the fibrous layer comprising a plurality of multifilament having a linear density of at least 200 dtex, a tenacity of at least 10 grams per dtex, and an elongation to break of at least 2%; and a polymer layer covering and adhering to more than 25% and less than 75% of a first side of the fibrous layer, the polymer layer comprising a thermoplastic polymer, a thermoset polymer, or a polymer having a glass transition temperature of −40° C. to 0° C., a molecular weight ($M_w$) of 20,000 to 100,000, and a viscosity of about $2 \times 10^6$ to about $10^{13}$ poise at 20° C.;

wherein the first side of the fibrous layer has a plurality of discrete areas that are not covered or adhered to by the polymer layer.

One embodiment of the invention is illustrated by FIG. 1. 10 represents a composite layer. The portion of the fibrous layer to which the polymer is superposed is represented by 20. The discrete areas that are not covered by the polymer layer are indicated by 30.

The fibrous layer can be a woven or nonwoven fabric.

By "non-woven" fabric is meant a network of fibers, including unidirectional fibers (optionally contained in a polymer matrix), felt, fiber batts, and the like. In some embodiments, the matrix can be a thermoplastic or thermoset polymer.

By "woven" fabric is meant a fabric woven using any fabric weave, such as plain weave, crowfoot weave, basket weave, satin weave, twill weave, and the like. Plain and twill weaves are believed to be the most common weaves used in the trade.

For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" or "continuous filament" is used interchangeably with the term "fiber."

Examples of suitable fibers for use in the layers include those made from a polymer such as a polyolefin (for example, polyethylene or polypropylene), polyimide, polyester, poly (vinyl alcohol), polyareneazole, polybenzazoles, such as polybenzoxazole (PBO), polyaramid, such as poly(paraphenylene terephthalamide) sold by E. I. du Pont de Nemours and Company (DuPont), Wilmington, Del. under the trade name KEVLAR®, and polypyridazoles, such as the polypyridobisimidazole available from Magellan Systems International, Richmond Va. under the trade name M5®. In some embodiments, the tenacity of a fiber should be at least about 35 grams per dtex according to ASTM D-885 in order to provide superior ballistic penetration resistance. In some embodiments, the fiber preferably also has a modulus of at least about 1000 grams per dtex.

In one embodiment, when the polymer is polyamide, aramid is preferred. By "aramid" is meant a polyamide wherein at least 85% of the amide (—CO—NH—) linkages are attached directly to two aromatic rings. Suitable aramid fibers are described in *Man-Made Fibers—Science and Technology*, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511. Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

One preferred aramid is a para-aramid and poly(p-phenylene terephthalamide)(PPD-T) is the preferred para-aramid. By PPD-T is meant the homopolymer resulting from approximately mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

When the filament comprises polyolefin, polyethylene or polypropylene are two preferred polymers. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. One such polymer is commonly known as extended chain polyethylene (ECPE). Similarly, polypropylene is preferably a predominantly linear polypropylene material of more than one million molecular weight. High molecular weight linear polyolefin fibers are commercially available. Preparation of polyolefin fibers is discussed in U.S. Pat. No. 4,457,985.

Polyareneazole polymers, such as polybenzazoles and polypyridazoles, can be made by reacting a mix of dry ingredients with a polyphosphoric acid (PPA) solution. The dry ingredients may comprise azole-forming monomers and metal powders. Accurately weighed batches of these dry ingredients can be obtained through employment of at least some of the preferred embodiments of the present invention.

Exemplary azole-forming monomers include 2,5-dimercapto-p-phenylene diamine, terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, 2,6-bis(4-carboxyphenyl) pyridobisimidazole, 2,3,5,6-tetraaminopyridine, 4,6-diaminoresorcinol, 2,5-diaminohydroquinone, 1,4-diamino-2,5-dithiobenzene, or any combination thereof Preferably, the azole forming monomers include 2,3, 5,6-tetraaminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The azole-forming monomers and metal powders are mixed and then the mixture is reacted with polyphosphoric acid to form a polyareneazole polymer solution. Additional polyphosphoric acid can be added to the polymer solution if desired. The polymer solution is typically extruded or spun through a die or spinneret to prepare or spin the filament.

Polybenzoxazole (PBO) and polybenzothiazole (PBZ) are two suitable polybenzazole polymers. These polymers are described in PCT Application No. WO 93/20400. Polybenzoxazole and polybenzothiazole are preferably made up of repetitive units of the following structures:

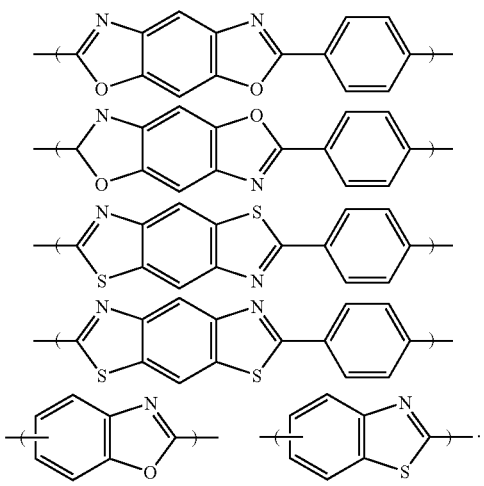

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned PCT Patent Application No. WO 93/20400.

Fibers made from poly(pyridazole) polymers are suitable for use in the present invention. These polymers include poly (pyridimidazle), poly(pyridothiazole), poly(pyridoxazole), poly(pyridobisimidazole), poly(pyridobisthiazole), and poly (pyridobisoxazole).

Poly(pryidobisimidazole) is a rigid rod polymer that is of high strength. The poly(pyridobisimidazole) fiber can have an inherent viscosity of at least 20 dl/g or at least 25 dl/g or at least 28 dl/g. Such fibers include M5® fiber and fiber made from poly[2,6-diimidazo[4,5-b:4, 5-e]-pyridinylene-1,4(2,5-dihydroxy)phenylene). PIPD fiber is based on the structure:

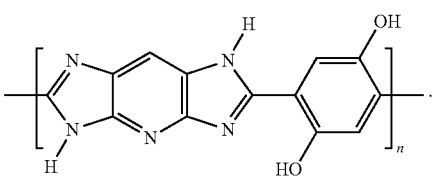

PIPD fibers have been reported to have the potential to have an average modulus of about 310 GPa (2100 grams/denier) and an average tenacities of up to about 5.8 GPa (39.6 grams/denier). These fibers have been described by Brew, et al., *Composites Science and Technology* 1999, 59, 1109; Van der Jagt and Beukers, *Polymer* 1999, 40, 1035; Sikkema, *Polymer* 1998, 39, 5981; Klop and Lammers, *Polymer,* 1998, 39, 5987; Hageman, et al., *Polymer* 1999, 40, 1313.

The polymer layer comprises a polymer having a glass transition temperature of −40° C. to 0° C., a molecular weight ($M_w$) of 20,000 to 100,000, and a viscosity of about $2 \times 10^6$ to about $10^{13}$ poise at 20° C. In some embodiments, the polymer is a thermoplastic or thermoset polymer. In some embodiments, the polymer is selected from one or more members of the group consisting of poly(vinyl propionate), poly(hexyl methacrylate), poly(isopropyl acrylate), and ethylene/methyl acrylate copolymer. In other embodiments, examples of suitable polymers include ethylene methacrylic acid (E/MAA) copolymers (such as Surlyn®, marketed by DuPont), polypropylene, polyethylene, polybutadiene, polyisoprene, polyurethane elastomers, vinyl ester, diallyl phthalate, epoxy vinyl esters. The polymer layer preferably comprises about 5 to about 30, more preferably about 8 to about 20, percent by weight of the fabric composite.

The discrete areas not covered by the polymer layer can be formed by removal of material from the polymer layer. This process can be performed prior to contacting the polymer layer with the fibrous layer or after such contact. Any conventional means form removing material from a film may be used. These methods include, for example, use of a die cutter.

The glass transition temperatures were measured using differential scanning calorimetry (DSC) at 10° C./min heating rates. The center point of the transition was chosen as Tg. Tg is expressed in ° C. throughout the specification.

Unless, noted otherwise, molecular weights referred to herein are weight average (Mw) molecular weight.

Viscosity is typically measured at room temperature, but when the viscosities of the compositions are too high at room temperature to be measured by standard techniques, viscosity is estimated by extrapolating from high temperature melt viscosity, melt flow index characterization or other qualitative rheological characterization. One typical method applied for zero shear viscosity characterization of polymer fluids is cone-and-plate rheometry or capillary viscometry.

EXAMPLES

This invention will now be illustrated by the following specific examples.

Comparative Example 1

In the Comparative Example 1, type 129, 840 denier (930 dtex), poly(p-pheynlene terephthalamide) yarns available from E. I. du Pont de Nemours and Company under the trademark Kevlar® were woven into a fabric of 26×26 ends per inch (10.2×10.2 ends per centimeter) construction. Twenty-one layers of the woven fabric of about 15" by 15"

size were stitched together around the edge and with a cross stitch to form a composite structure with a total areal density of about 4.2 kg/m². The assembly was then tested against 0.357 mag bullet per NIJ ballistic standard 0101.04 for Level II for both ballistic V50 and backface deformation. The results, as shown in Table I, revealed a backface deformation of about 42 mm which was much higher than desired, though its ballistic V50 was acceptable.

Comparative Example 2

In the Comparative Example 2, type 129, 840 denier (930 dtex), poly(p-pheynlene terephthalamide) yarns available from E. I. du Pont de Nemours and Company under the trademark Kevlar® were woven into a fabric of 26×26 ends per inch (10.2×10.2 ends per centimeter) construction in a manner identical to that employed to prepare for fabric for Comparative Example 1, except that each fabric layer was further laminated with a layer of Surlyn film of about 38 microns, available from E. I. du Pont de Nemours and Company, under the press condition of about 100° C. and 100 psi for about 20 minutes. Nineteen layers of the laminated fabric of about 15" by 15" size were stitched together around the edge and with a cross stitch to form a relatively rigid composite structure with a total areal density of about 4.1 kg/m². The assembly was then tested against 0.357 mag bullet per NIJ ballistic standard 0101.04 for Level II for both ballistic V50 and backface deformation. The results, as shown in Table I, revealed a significantly low ballistic V50 of the composite structure of the example and a complete penetration by the bullet.

Example 1

In Example 1 of this invention, type 129, 840 denier (930 dtex), poly(p-pheynlene terephthalamide) yarns available from E. I. du Pont de Nemours and Company under the trademark Kevlar® were woven into a fabric of 26×26 ends per inch (10.2×10.2 ends per centimeter) construction in a manner identical to that employed to prepare for fabric for Comparative Example 1. Each fabric layer was further laminated with a layer of Surlyn® film of about 38 microns, available from E. I. du Pont de Nemours and Company, in a manner identical to that employed to prepare for the laminated fabric for Comparative Example 2, except that a die cutter was used to punch nine holes of about 2.25" by 3.125" (5.7 cm×7.9 cm or 45.0 cm²) each through the Surlyn® film which resulted in a plurality of isolated domains of about 28% of area free of Surlyn®. Lamination was conducted under the press condition of about 100° C. and 100 psi for about 20 minutes. Twenty layers of the laminated fabric of about 15" by 15" size were stitched together around the edge and with a cross stitch to form a relatively rigid composite structure with a total areal density of about 4.2 kg/m². The assembly was then tested against 0.357 mag bullet per NIJ ballistic standard 0101.04 for Level II for both ballistic V50 and backface deformation. The results, as shown in Table I, indicated a significant reduction in backface deformation of 31 mm with minimum loss in ballistic V50.

Example 2

In Example 2 of this invention, type 129, 840 denier (930 dtex), poly(p-pheynlene terephthalamide) yarns available from E. I. du Pont de Nemours and Company under the trademark Kevlar® were woven into a fabric of 26×26 ends per inch (10.2×10.2 ends per centimeter) construction in a manner identical to that employed to prepare for fabric for Example 1. Each fabric layer was further laminated with a layer of Surlyn® film of about 38 microns, available from E. I. du Pont de Nemours and Company, in a manner identical to that employed to prepare for the laminated fabric for Example 1, except that a die cutter was used to punch seven holes of about 1.5" by 10" (3.8 cm×25.4 cm or 96.8 cm²) each through the Surlyn® film which resulted in a plurality of isolated domains of about 47% of area free of Surlyn®. Lamination was conducted under the press condition of about 100° C. and 100 psi for about 20 minutes. Twenty layers of the laminated fabric of about 15" by 15" size were stitched together around the edge and with a cross stitch to form a relatively rigid composite structure with a total areal density of about 4.1 kg/m². The assembly was then tested against 0.357 mag bullet per NIJ ballistic standard 0101.04 for Level II for both ballistic V50 and backface deformation. The results, as shown in Table I, again indicated a significant reduction in backface deformation of 36 mm with minimum loss in ballistic V50.

TABLE 1

| Example | Areal Density (kg/m²) | % Isolated Domain Free of Resin | Average Backface Deformation (mm) against .357 mag at 436 m +/− 10 m/s | V50 (M/s) |
|---|---|---|---|---|
| Comp. Ex. 1 | 4.2 | 100 | 42 | 475 |
| Comp. Ex. 2 | 4.1 | 0 | Penetrated (failed) | 431 |
| Ex. 1 | 4.2 | 28 | 31 | 455 |
| Ex. 2 | 4.1 | 47 | 36 | 460 |

What is claimed:

1. A method of making an article for use in resisting ballistic threats, comprising:
   providing a polymer layer comprising a thermoplastic polymer, a thermoset polymer or a polymer having a glass transition temperature of −40° C. to 0° C., a molecular weight of 20,000 to 100,000, and a viscosity of about $2 \times 10^6$ to about $10^{13}$ poise at 20° C.;
   forming a plurality of holes in said polymer layer; and
   covering and adhering said polymer layer to a first side of a fibrous layer, said fibrous layer having a first and a second side and comprising a plurality of multifilament yarns having a linear density of at least 200 dtex, a tenacity of at least 10 grams per dtex, and an elongation to break of at least 2%;
   whereby more than 25% and less than 75% of the first side of the fibrous layer is covered and adhered by the polymer layer.

2. The method of claim 1, wherein the polymer layer comprises a thermoplastic or thermoset polymer.

3. The method of claim 1, wherein the holes are discrete and each of the holes has an area from 0.25 cm² to 150 cm².

4. The method of claim 1, wherein the discrete areas are circular, square, triangular, rectangular, polygonal or defined by irregular contours.

* * * * *